US009937995B1

(12) United States Patent
Combs et al.

(10) Patent No.: US 9,937,995 B1
(45) Date of Patent: Apr. 10, 2018

(54) PNEUMATIC FASTENING FOR FASTENING A SURFACE PANELING TO AN AIRCRAFT SURFACE

(71) Applicant: Northrop Grumman Systems Corporation, Falls Church, VA (US)

(72) Inventors: Cory M. Combs, Del Aire, CA (US); Charles Smith, Acton, CA (US); John Rufino, Long Beach, CA (US); Kevin A. Noertker, Los Angeles, CA (US); Greg A. Cifu, Redondo Beach, CA (US)

(73) Assignee: NORTHROP GRUMMAN SYSTEMS CORPORATION, Falls Church, VA (US)

( * ) Notice: Subject to any disclaimer, the term of this patent is extended or adjusted under 35 U.S.C. 154(b) by 94 days.

(21) Appl. No.: 15/246,275

(22) Filed: Aug. 24, 2016

(51) Int. Cl.
*B64C 1/06* (2006.01)
*B64C 1/12* (2006.01)
*B64F 5/00* (2017.01)

(52) U.S. Cl.
CPC .............. *B64C 1/12* (2013.01); *B64F 5/0009* (2013.01)

(58) Field of Classification Search
CPC ........... B64C 1/12; B64C 1/14; B64C 1/1446; B64C 1/1407; B64C 1/1461; B64C 1/1423; Y10T 403/22; Y10T 403/592; E05B 51/02; E05B 2051/06; F16B 1/005; F16B 1/0057; B64D 29/06; B64D 29/08
See application file for complete search history.

(56) References Cited

U.S. PATENT DOCUMENTS

| 4,906,123 | A * | 3/1990 | Weskamp | B23Q 1/0063 |
| | | | | 403/322.2 |
| 4,929,135 | A * | 5/1990 | Delarue | B64G 1/645 |
| | | | | 102/378 |
| 8,443,575 | B1 * | 5/2013 | Tanner | E04C 2/54 |
| | | | | 244/129.3 |
| 9,387,937 | B2 * | 7/2016 | Grewe | B64D 25/20 |
| 2012/0269921 | A1 * | 10/2012 | Rentz | B29C 33/20 |
| | | | | 425/451.9 |

* cited by examiner

*Primary Examiner* — Richard G Davis
(74) *Attorney, Agent, or Firm* — Stetina Brunda Garred & Brucker

(57) ABSTRACT

A pneumatic fastening mechanism is provided for fastening an aircraft surface panel to an aircraft panel support member. The panel includes a plurality of receptacles extending from the panel lower surface. The panel support member includes a corresponding plurality of panel engagement mechanisms, disposed on the support member lower surface, and translatable through the support member to engage the receptacles. The panel engagement mechanisms are extendable from a first position, wherein the panel abuts and is engaged to the panel support member, to second position wherein the panel is elevated above the panel support member upper surface where the panel may be unlocked and separated from the panel engagement mechanism. The panel engagement mechanism is operative to elevate and release the panel in response to changes in fluid pressure communicated to the panel engagement mechanisms.

20 Claims, 5 Drawing Sheets

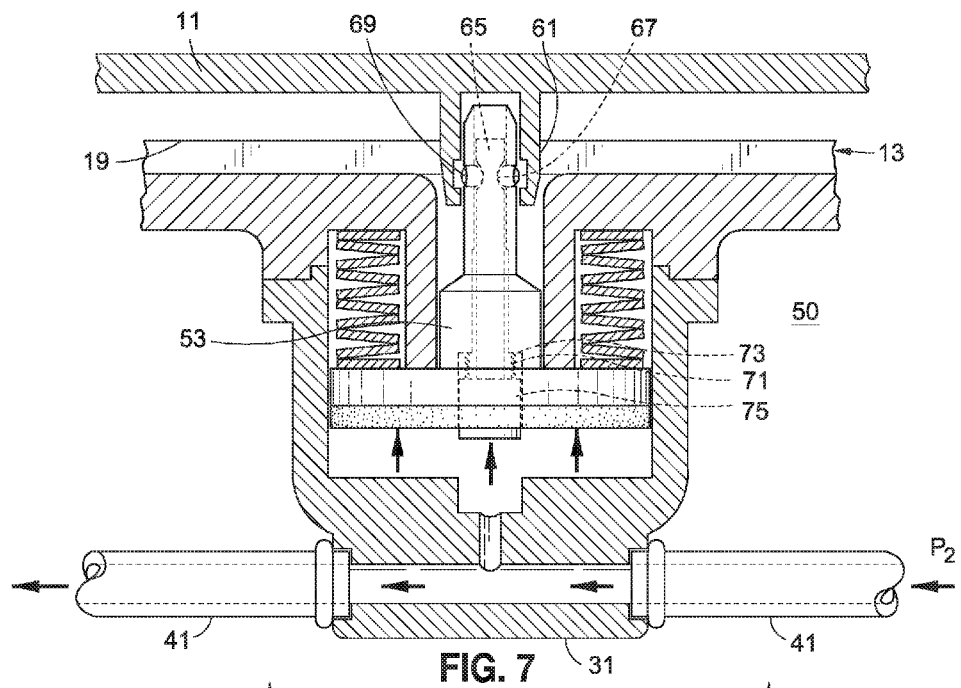
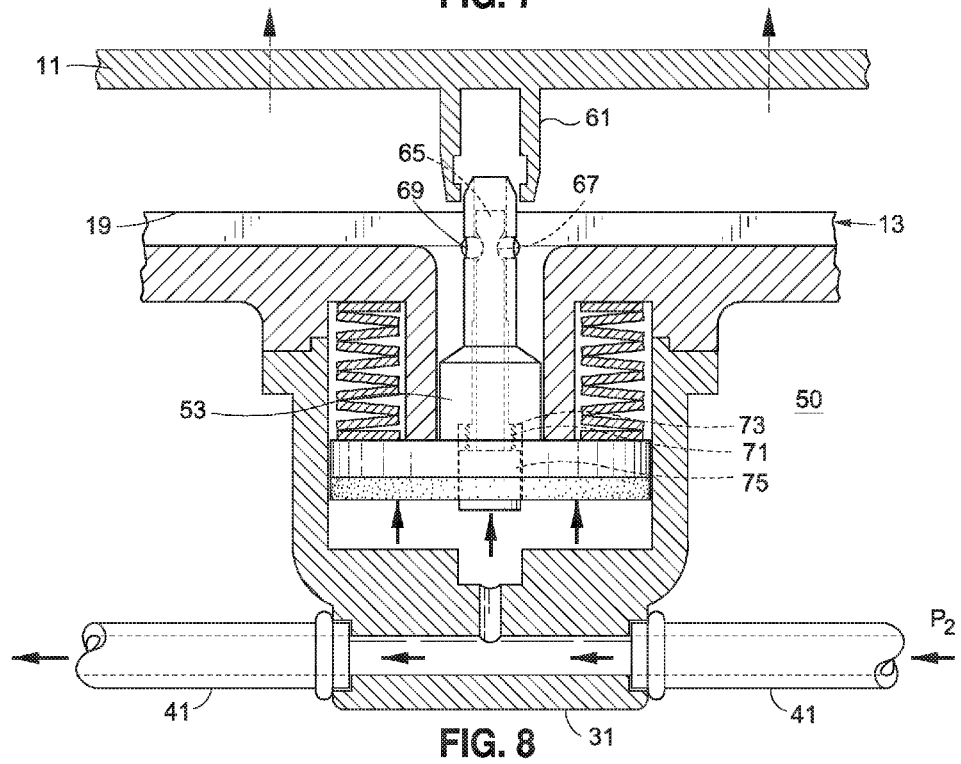

PNEUMATIC FASTENING FOR FASTENING A SURFACE PANELING TO AN AIRCRAFT SURFACE

STATEMENT RE: FEDERALLY SPONSORED RESEARCH/DEVELOPMENT

Not Applicable

BACKGROUND

The present invention relates to a latching mechanism that allows a removable access panel to separate from a supporting surface when access to the aircraft interior is desired. More particularly, the present invention relates to a latching mechanism suitable for rapid removal and reinstallation of aircraft outer mold line (OML) panels and doors.

In the building of aircraft, both civil and military, exterior panels, doors and other structures are provided which can be removed for repair or to allow access to aircraft systems, e.g. mechanical, electrical or hydraulic, disposed within the body of the aircraft. The panel doors are preferably formed flush with the adjacent aircraft surface, to avoid interference with aerodynamic characteristics of the aircraft. Irregularities in an aircraft surface can also mitigate low observable characteristics of an aircraft, as RF signals may reflect from surface irregularities and detract from low observable characteristics of the aircraft.

While panels may be conventionally engaged to an aircraft surface by means of screws or similar fasteners, such connecting means commonly require torqueing the fasteners to a desired pressure, can result in wear and loosening of the fasteners during use, and can preload the panels into undesirable levels. Moreover, in practical circumstances of use, fasteners can fall into the aircraft interior when installing or removing the panel, creating potentially hazardous conditions with respect to mechanical and electrical systems disposed in the vicinity. As such, alternative latching mechanism are desirable in order to allow for greater ease of installation and removal, avoidance of creating undue loads on panel and mitigating the prospect of accidentally releasing undesirable debris within the aircraft body which may be difficult to locate and potentially damaging to aircraft electrical and mechanical systems. Further, as noted above, it is desirable such that latching mechanism exhibit minimal surface irregularities, to retain desired aerodynamic and low observable characteristics. Ideally the latching mechanism will allow installation and removal of the panel without the need to even touch the panel upper surface. Preferably, such latching system will also provide suitable sealing characteristics to facilitate airtight and watertight isolation of the aircraft electrical/mechanical/hydraulic systems, as well as mitigating the potential for noise associated with gaps between adjacent aircraft surface portions.

These and other objects and advantages are addressed in the present invention, which is described in exemplary terms below, in connection with the illustrated embodiments.

BRIEF SUMMARY

A pneumatic fastening mechanism is provided for fastening an aircraft surface panel to an aircraft panel support member. The panel includes a plurality of receptacles extending from the panel lower surface and the panel support member includes a corresponding plurality of panel engagement mechanisms, disposed on the support member lower surface, and translatable to through the support member to engage the receptacles. The panel engagement mechanisms are translatable from a first locking configuration to a second releasing configuration, in response to changes in fluid pressure communicated to the panel engagement mechanisms. The panel engagement mechanisms are extendable from a first position wherein the engaged panel abuts the panel support member upper support surface to second position wherein the panel is elevated to a location above the panel support member upper support surface. Once the panel is translatable to the elevated position it may be unlocked and separated from the panel engagement mechanism. The panel engagement mechanism is operative to elevate and release the panel in response to changes in fluid pressure communicated to the panel engagement mechanisms.

In the presently preferred embodiment the panel engagement mechanisms include a plunger mechanism which is translatable into and out of a corresponding panel receptacle receiving channel. The receiving channel may define a receiving channel engagement surface. The plunger mechanisms are translated into and out of locking engagement with the receiving channel engagement surface in response to changes in fluid pressure communicated to the panel engagement mechanisms.

The plunger mechanisms are translatable to elevate the panel from a position abutting the panel support member upper surface, to a position above the panel support member upper surface, in response to changes in fluid pressure communicated to the panel engagement mechanisms.

In the presently preferred embodiment, an attached panel may be removed by applying a first level of fluid pressure applied to the panel engagement mechanisms, causing the plunger mechanisms to extend upwardly from the panel engagement mechanism such that the attached panel is raised from the panel support member. As the fluid pressure is applied at second pressure level, the plungers translate from the configuration wherein they are locked to panel receptacles, to a configuration wherein the panel receptacles are released, and the panel can be removed from their supported position on the plungers.

Where the panel is to be installed on the aircraft surface, pressure is communicated to the panel engagement mechanisms at a level which causes the plungers to extend from the panel engagement mechanisms and translate to an unlocked configuration. Thereafter, the panel may be positioned on the plungers, such that the plungers extend into the receptacles formed on the lower surface of the panel. As the pressure level is decreased, the plunger mechanisms translate to a locked configuration, engaging the panel to the plunger mechanisms. As the pressure level communicated to the panel engagement mechanism is decreased below the first level, the plunger retracts within the panel engagement mechanisms, causing the attached panel to translate to a position abutting the panel support member, substantially flush with the adjacent aircraft outer surface.

BRIEF DESCRIPTION OF THE DRAWINGS

These and other features and advantages of the various embodiments disclosed herein will be better understood with respect to the following description and drawings, in which like numbers refer to like parts throughout, and in which:

FIG. 7 is a cross-sectional view showing the panel engagement mechanism where the panel above the panel is elevated support surface, and unlocked from the panel support mechanism; and FIG. 8 is a cross-sectional view showing the panel engagement mechanism where the panel has been separated from the panel support mechanism.

DETAILED DESCRIPTION

The detailed description below is given by way of example, and not limitation. Given the disclosure, one skilled in the art could devise variations that are within the scope and spirit of the invention disclosed herein. Further, the various features of the embodiments disclosed herein can be used alone, or in varying combinations with each other and are not intended to be limited to the specific combination described herein. Thus, the scope of the claims is not to be limited by the illustrated embodiments.

Figure 1:
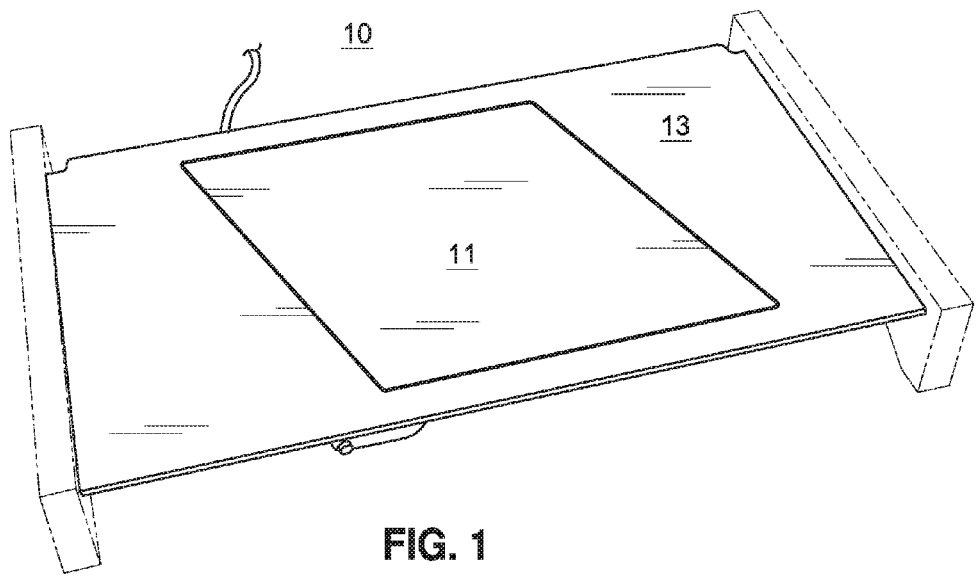
FIG. 1 is a perspective view showing a removal aircraft surface panel and placed along an aircraft supporting surface.

FIG. 1 is a perspective view of the pneumatic fastening mechanism 10, showing aircraft panel 11 in place on panel support member 13. As described above, the aircraft panel 11 may be removed from the panel support member 13, to allow access to aircraft electronic, mechanical or pneumatic systems disposed below the panel 11. Moreover, as described above, it is desirable that the panel 11 does not include any handles or fasteners that might negatively effect the aerodynamic or low observable characteristics of the aircraft.

Figure 2:
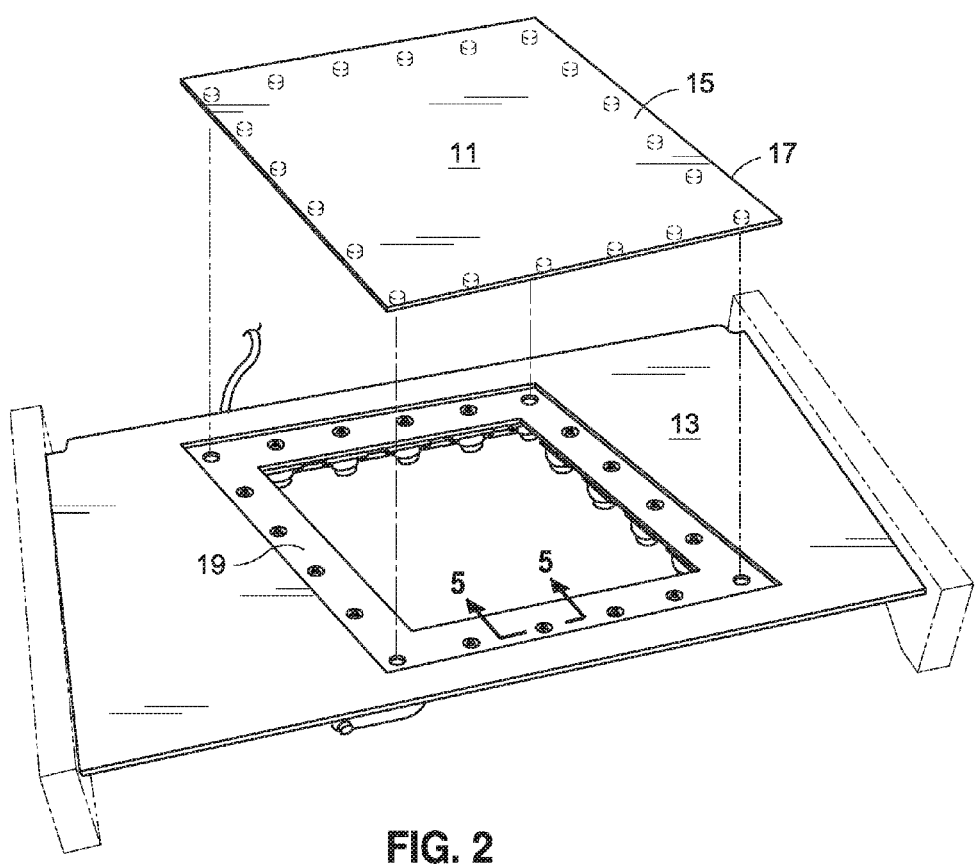
FIG. 2 is an exploded view showing the aircraft panel separated from the supporting surface.

FIG. 2 illustrates the panel 11 as separated from the panel support member 13. FIG. 2 also illustrates the upper support surface 19, of panel support member 13, which is formed to receive and support panel 11.

Figure 3:
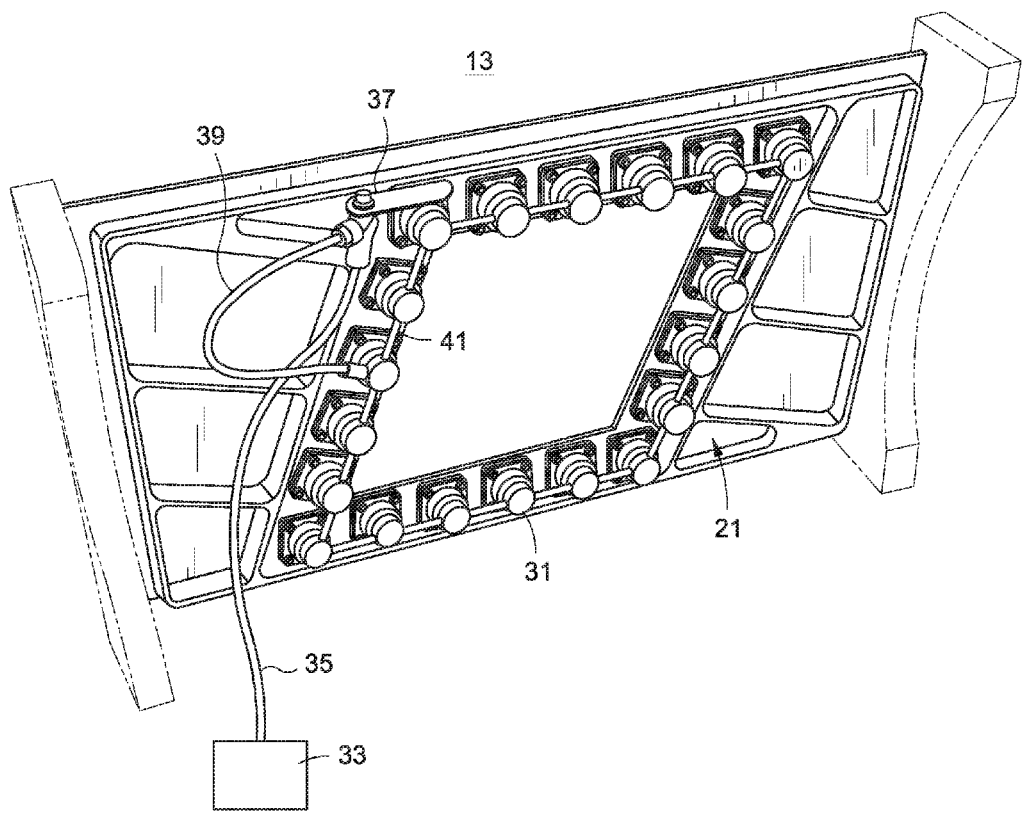
FIG. 3 is a perspective view of the lower surface of the panel supporting surface.

FIG. 3 illustrates the lower surface 21 of panel support member 13. As shown therein, a plurality of panel engagement mechanisms 31 are disposed about the panel support member 31, opposite the panel support surface 19, shown at FIG. 2.

In the embodiment as shown in FIG. 3, the panel support mechanisms 31 are serially connected to each other, and to a pressure source 33, pressure controller 37, and conduits 35, 39, 41. In the illustrated embodiment pressure source 33 is a positive pressure source.

In the presently preferred embodiment, controller 37 operates to regulate the pressure level applied to the panel engagement mechanisms. In flight mode, with the panel installed, no pressure is communicated to the panel engagement mechanism, which remains locked to the panel.

Where the panel is to be disengaged from the panel engagement mechanism the controller 37 operates to provide a first pressure level to elevate the panel to a position above the panel support member, and second pressure level to disengage the panel support mechanism from the elevated panel. As such, as described further below, the panel 11 may then be removed by lifting the lower surface 17 of panel 11, without any need to engage any tools or fasteners to the upper surface of panel 11. In relation to the illustrated configuration, the first and second pressure levels are the same, i.e., approximately 60 PSI.

As will be apparent to those skilled in the art, the particular arrangement of the panel engagement mechanisms 31 may be varied as necessary to accommodate pressure forces applied to panel 11 in flight, and to accommodate any curvatures in the panel 11. Further, the construction of panel engagement members 31, the associated pressure levels, and the selection of biasing springs may be varied in view of the same and additional factors.

Figure 4:
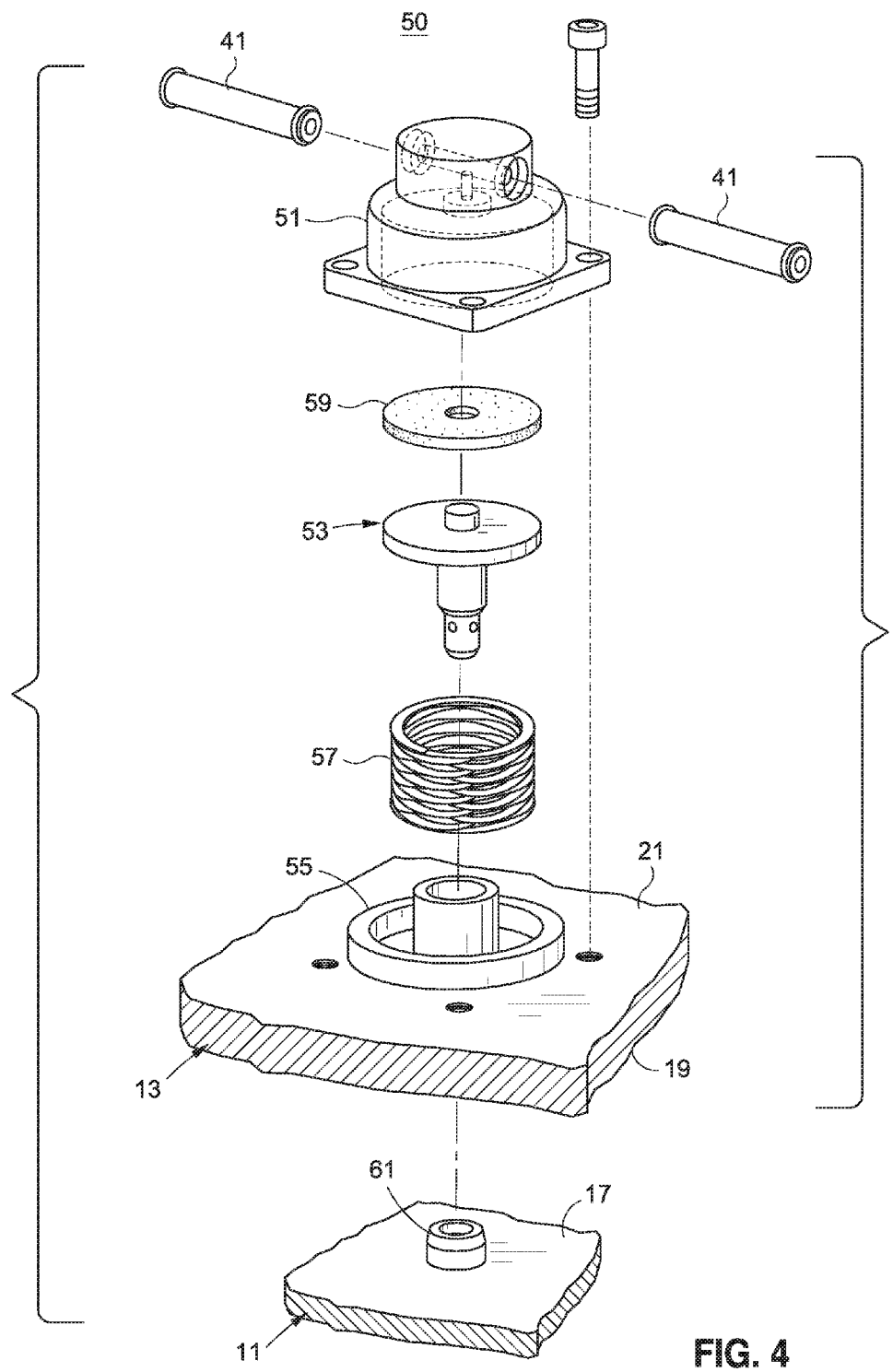
FIG. 4 is an exploded view of a panel engagement mechanism mounting to the panel support surface.

FIG. 4 provides further illustration of exemplary panel support mechanism. As shown therein, panel engagement mechanism 50 includes a housing 51, a plunger 53, a wave spring 57, and collar 55. As described further below, the plunger 53 is translatable within the panel engagement mechanism 50 to engage the receptacles 61 disposed on the lower surface 17 of panel 11. Once engaged to the receptacle 61, and pressure is reduced, the plunger 53 is translatable to draw the panel lower surface 17 into abutting contact with the panel support surface 19 of the panel engagement member 13, and flush with the adjacent aircraft outer surface.

To remove the attached panel pressure is applied to the panel engagement mechanism 50 through conduits 41. The plunger is then translatable to elevate the panel 11 from abutting contact with the panel support surface to a position above from the panel support surface 19, where, upon the application of additional pressure, the panel 11 may be disengaged from the plunger 53 and removed.

The receptacles 61 may be secured to the panel lower surface 17 by various means that avoid the need for fasteners or other members that extend through the panel 11 to create irregularities on the panel upper surface. For example, the receptacles 63 may be secured to the panel lower surface 17 by means such as laser welding, adhesives and/or mechanical clamping force.

Figure 5:
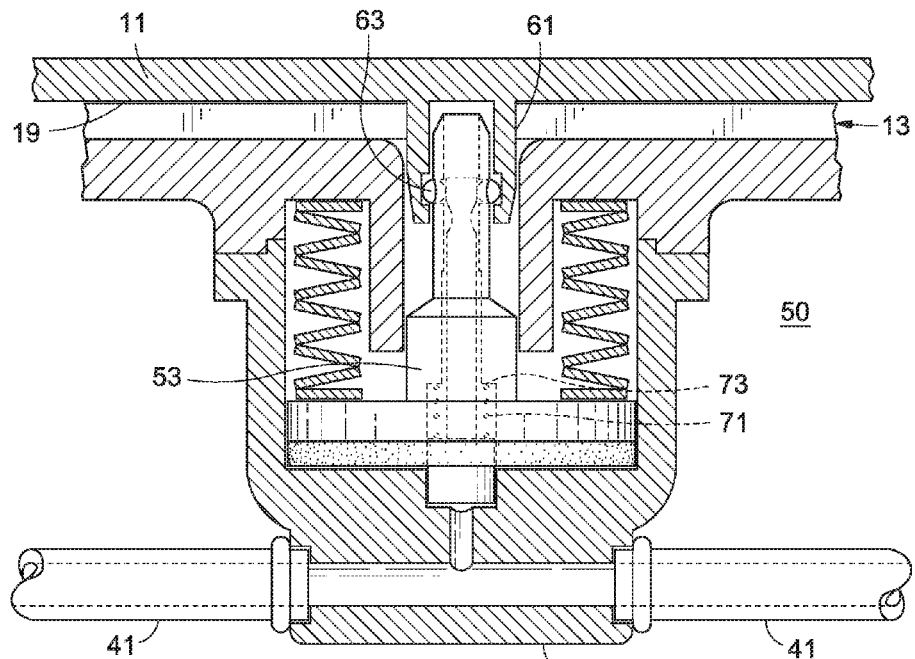
FIG. 5 is a cross-sectional view of the panel support mechanism engaged to the panel.

FIGS. 5-8 illustrate different configurations of the panel support mechanism 50 to implement the functionality of the present invention. FIG. 5 illustrates a configuration wherein the receptacle 63 is engaged to the plunger mechanism 53. In the absence of any pressure applied to the panel support mechanism 50, wave spring 57 functions to draw the panel 11 into abutting contact with the panel support surface 19 of panel support member 13.

Figure 6:
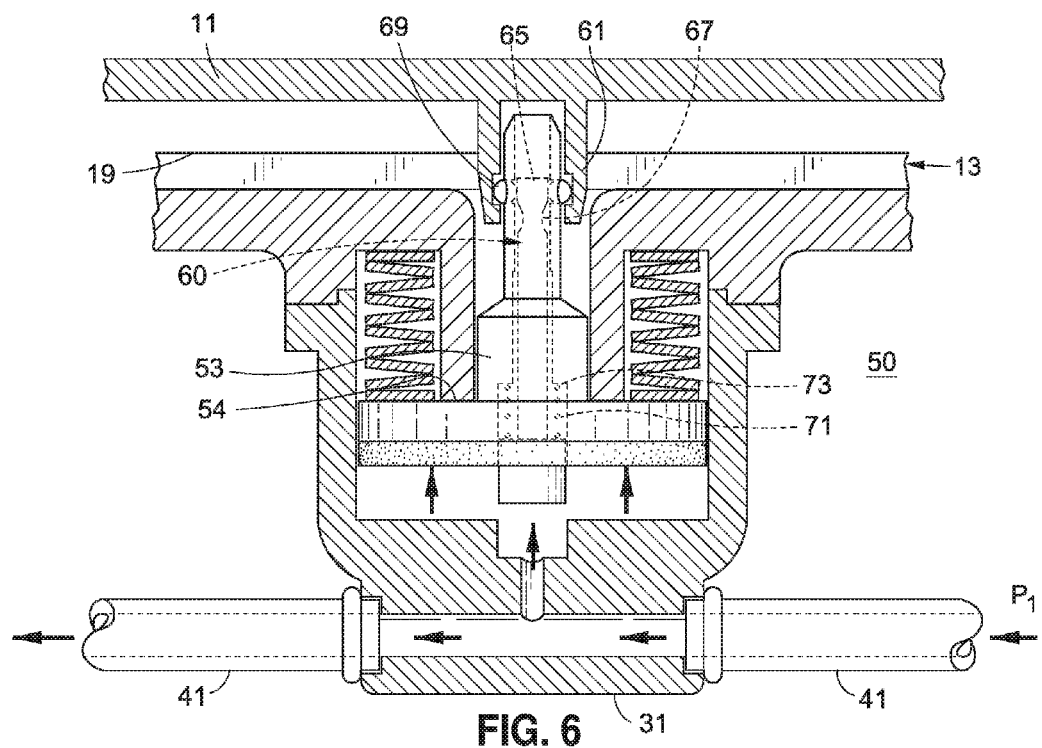
FIG. 6 is a cross-sectional view showing the panel engagement mechanism where the panel is elevated above the panel support surface.

FIG. 6 illustrates the configuration of panel engagement mechanism 50 when a pressure level P1 is applied to the panel engagement mechanism 50. As shown at FIG. 6, pressure P1 is operative to urge plunger mechanism 53 to move upwardly such that panel 11, is elevated, panel 11 is engaged to plunger mechanism 53 via locking mechanism 60, which is engaged to engagement surface 63 of receptacle 61. The pressure level P1 is selected to be sufficiently high to overcome the resistance of the wave spring 57. The translation of the plunger mechanism terminates when the plunger mechanism 50 abuts against surface 54.

FIGS. 7 and 8 illustrate the configuration of the panel support mechanism 50 when pressure is applied to the panel engagement mechanism 50 is equal to or greater than a pressure level of P2, where P2 is a higher pressure level than P1. As previously indicated, the translation of the plunger mechanism 53 is limited by abutting engagement of the plunger to surface 54. However, locking mechanism 60 responds to the additional pressure P2 by translating spring compression member 75 to compress spring 71. The translation of spring compression member 75 translates shaft 65, such that shaft recess 67 is disposed adjacent the locking balls 69, allowing the locking balls to retract within the plunger mechanism. As a result, the locking mechanism 60 no longer engages the receptacle 61, and the panel 11 may be disengaged from the plunger mechanism, as shown at FIG. 8.

As noted above, the present invention allows an aircraft exterior panel to be installed or removed without the need for any exterior fasteners or other surface irregularities that might adversely effect aircraft aerodynamics or low observability characteristics. More specifically the present invention allows the panel to be translated into and out abutting engagement with the aircraft surface independent of any use or contact with the panel. The panel may be transported to the aircraft by simply manually holding receptacles disposed on the lower surface of the panel, and then positioned onto the extended plunger mechanisms, without the need to even touch the upper surface of the panel. This could provide substantial advantages where touch sensitive coatings or touch sensitive surfaces are used on the aircraft.

Those skilled in the art will recognize the additional potential advantages of the present invention which may be achieved in connection with the illustrated embodiments, or modification thereof that remain within the spirit and scope of the present invention.

What is claimed is:

1. A pneumatic fastening system for fastening an aircraft surface panel to an aircraft support surface comprising:
   an aircraft panel defining an upper surface, a lower surface, and a plurality of receptacles extending from the panel lower surface;
   an aircraft panel support member extending substantially parallel to the panel, the panel support member defining an upper support panel surface, a lower surface, and a plurality of panel engagement mechanisms disposed on the support member lower surface, the panel engagement mechanisms being translatable through the support member to engage the panel receptacles; and
   a pressure source in fluid communication with the plurality of the panel engagement mechanisms;
   the panel engagement mechanisms being translatable from a first configuration where the panel engagement mechanisms are in locking engagement with the panel receptacles, to a second configuration wherein the panel is elevated above the panel support surface and the panel support member engagement mechanisms and the panel receptacles are separable; and
   wherein the panel engagement mechanisms are translatable between the first and second configurations in response to changes in fluid pressure communicated to the support member engagement mechanisms.

2. The mechanism as recited in claim 1, wherein the panel engagement mechanisms further comprise a spring member disposed intermediate the panel engagement mechanisms and the panel support member, the spring member, being operative to urge the panel to a first position, abutting the panel support surface when pressure applied to the panel engagement mechanisms is below a first pressure level.

3. The mechanism as recited in claim 1, wherein the panel translates to a second position above the panel support surface, when the pressure communicated to the panel engagement mechanisms is equal to or greater than the first pressure level.

4. The mechanism as recited in claim 3 wherein the panel engagement mechanisms translate to the second configuration when the pressure communicated to the panel engagement mechanisms is equal to or greater than a second pressure level, the second pressure level being equal to or greater than the first pressure level.

5. The mechanism as recited in claim 1, wherein the panel engagement mechanisms include a plunger mechanism which is translatable into and out of a corresponding panel receptacle receiving channel.

6. The mechanism as recited in claim 5, wherein the receptacle receiving channels define an engagement surface and the plunger mechanisms are translatable into and out of locking engagement with the corresponding receptacle receiving channel engagement surface in response to the changes of fluid pressure communicated to the panel engagement mechanisms.

7. The mechanism as recited in claim 6, wherein the plunger mechanisms are translatable to elevate the panel to a position above the panel support surface when fluid pressure communicated to the panel engagement mechanism is equal to or greater than a first pressure level.

8. The mechanism as recited in claim 7, wherein the plunger mechanisms are translatable to release the panel receptacle from locking engagement with the corresponding plunger mechanism when pressure communicated to the panel support panel engagement mechanism is equal to or greater than a second pressure level.

9. The mechanism as recited in claim 8, wherein the panel engagement mechanisms are operative to translate the plunger mechanisms into locking engagement with the panel receptacles when fluid pressure communicated to the panel engagement mechanisms falls below the second pressure level.

10. The mechanism as recited in claim 9, wherein the second pressure level is equal to the first pressure level.

11. The mechanism as recited in claim 8, wherein the plunger mechanisms include a ball-locking mechanism translatable to engage and disengage the corresponding receptacle receiving channel engagement surface.

12. The mechanism as recited in claim 11, wherein the ball locking mechanisms are translatable to engage and disengage the corresponding receptacle receiving channel engagement surface in response to changes in the fluid pressure level communicated to the panel engagement mechanisms.

13. The mechanism as recited in claim 4, wherein locking engagement of the panel and the panel engagement mechanism, and abutting contact between the panel and the panel support surface is maintained in the absence of fluid pressure applied to the panel engagement mechanism.

14. The mechanism as recited in claim 1, wherein the panel is translatable into and out of abutting engagement with the panel support surface independent of any user contact with the panel.

15. The mechanism as recited in claim 1, wherein the panel engagement mechanisms are serially connected to the pressure source.

16. The mechanism as recited in claim 1, wherein the pressure source is a positive pressure source.

17. A process for engaging an aircraft panel to a support member comprising:
   applying pressure at a first pressure level to a plurality of panel engagement mechanisms disposed on the panel support member, such that a panel engagement mechanism first portions extend from the panel support member;
   applying fluid pressure at a second level to the panel engagement mechanism, such that the panel engagement mechanism extended first portions translate to an unlocked configuration;
   locating the panel on the panel engagement mechanism extended first portions such that receptacles formed on the panel are in abutting contact with the panel engagement mechanism first portions;

lowering the fluid pressure level applied to the panel engagement mechanisms to a level between the first level and the second level such that the panel engagement mechanism extended first portions translate to a locked configuration, locking the panel engagement mechanism extended first portions to the panel; and lowering the fluid pressure applied to the panel engagement mechanism below the first level, such that the panel engagement mechanism first portions retract substantially within the panel engagement mechanisms and the panel translates to substantially abut against the panel support member.

18. The process as recited in claim 17, further comprising the step of subsequently terminating the application of fluid pressure to the panel engagement mechanisms, whereby the panel remains locked to the panel engagement mechanism first portions and the panel substantially abuts the panel support member.

19. A process for disengaging an aircraft panel from an abutting panel support member comprising:

applying a fluid pressure at a first pressure level to a plurality of panel engagement mechanisms disposed on the panel support member, such that first portions of the panel engagement mechanisms extend from the panel support member and a panel engaged to the panel mechanisms first portions translates to a position spaced from the panel support member and the panel engagement mechanism first portions translate to an unlocked configuration, unlocking the panel from the first portion; and disengaging the unlocked panel from the panel engagement mechanism first portions.

20. The process as recited in claim 19, further comprising the step of reducing the fluid pressure applied to the panel engagement mechanisms to a level below the first pressure level, such that the panel engagement mechanism first portions retract to a position substantially within the panel engagement mechanism.

\* \* \* \* \*